INVENTOR.
Karo Shimada

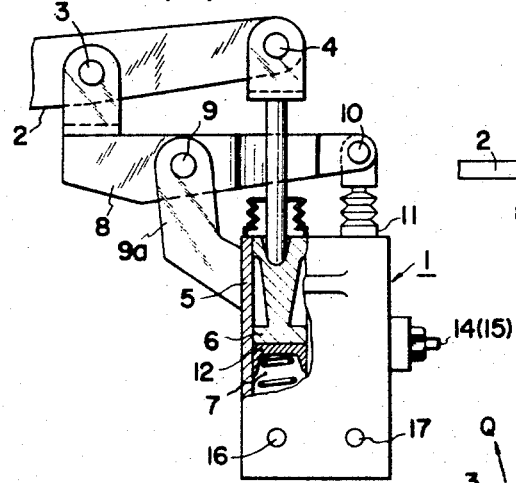
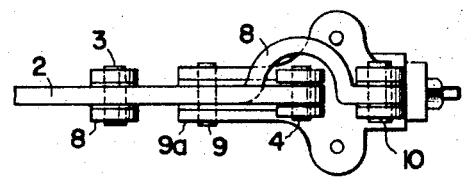
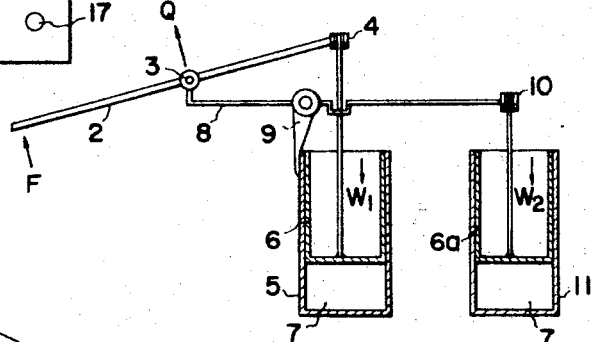
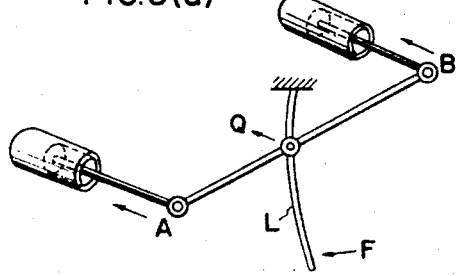
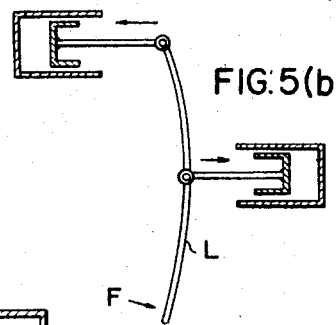
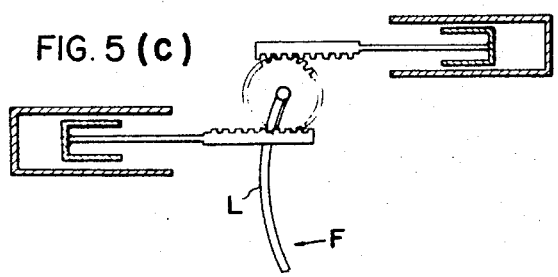

United States Patent Office 3,444,691
Patented May 20, 1969

3,444,691
MULTIPLE MASTER CYLINDER CONTROL DEVICE
Karo Shimada, 774, Kugahara-machi, Ota-ku, Tokyo-to, Japan
Filed Nov. 21, 1967, Ser. No. 684,829
Claims priority, application Japan, Nov. 24, 1966, 41/77,124
Int. Cl. F15b 7/08, 11/22
U.S. Cl. 60—54.6                    4 Claims

ABSTRACT OF THE DISCLOSURE

Two master cylinders closely positioned and connected respectively in two separate hydraulic systems are actuated by a compact differential linkage mechanism consisting essentially of a main lever pedal operated at one end and coupled at the other end to a piston of one master cylinder and a second lever pivoted at an intermediate point on a stationary pivot and coupled at one end to the piston of the other cylinder and at the other end to an intermediate point of the main lever to provide a movable pivot for the main lever.

---

Figure 1:
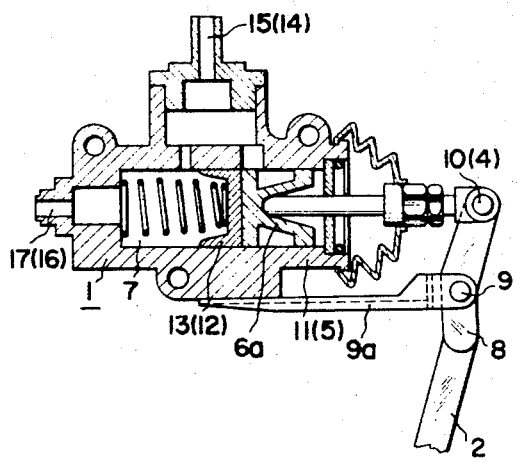
Figure 1:
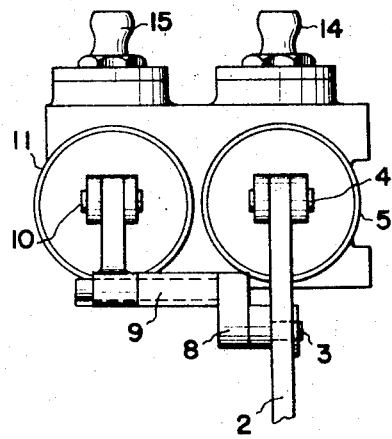

This invention relates generally to hydraulic (fluid-pressure) systems controllably operated by master cylinders. More particularly, the invention concerns a new master cylinder control device including multiple master cylinders for respective independent hydraulic systems and a differential mechanism for actuating the multiple master cylinders.

The device of the invention can be used, for example, in a hydraulic brake system of the type wherein hydraulic pressure produced in two or more master cylinders by the depression of a foot pedal is distributed through tubing to various wheel cylinders of a wheeled vehicle. In this case, the multiple master cylinders of the device of the invention are connected to respective independent hydraulic systems respectively for individual wheel cylinders or groups thereof. A feature of the device of the invention is that, even if a failure occurs in one of the hydraulic systems, the device operates in a normal manner through at least one other system to accomplish braking.

Various mechanisms in each of which two master cylinders are differentially actuated by a brake pedal to produce hydraulic pressure have heretofore been proposed or practically used in a few cases. In one such device, a lever is connected at its two ends to the pistons of two separate hydraulic cylinders and is actuated by force applied at its middle point. In another device, pedal force rotates a pinion meshed on opposite sides thereof with two racks respectively connected to the pistons of two hydraulic cylinders. Examples of these known devices are described more fully heretoinafter.

In each of these devices, however, the spacing between the pistons, and therefore the cylinders, tends to become large, whereby the device occupies much volumetric space. Since the available space for master cylinders is ordinarily limited, these devices have not been put to practical use except in certain special vehicles.

It is an object of the present invention to provide a multiple master cylinder control device of the character mentioned hereinabove for multiple hydraulic systems whereby safety is afforded by the normal operation of at least one system in the event of failure of another system.

Another object of the invention is to provide a master cylinder control device of the above stated character which is of simple, trouble-free organisation and occupies little space, whereby it can be readily installed in ordinary wheeled vehicles, particularly motor vehicles.

According to the present invention, briefly summarised, there is provided a master cylinder control device characterised by the combination of a plurality of master cylinders connected in respective independent hydraulic systems and disposed closely together in sequence and in the same operative direction and levers corresponding to the sequence each coupled at one end to the push rode of a respective one master cylinder, the first lever of the sequence being a main lever pivotally connected at an intermediate point to the other end of the succeeding lever, this succeeding lever and other levers, except the last lever, being similarly connected pivotally at intermediate points to the other ends of the respective succeeding levers, the last lever being pivotally connected at an intermediate point to a stationary pivot, whereby a force applied to the other distal end of the first lever causes all levers to operate differentially in the event of a failure of one hydraulic system thereby to accomplish normal operation through at least one other hydraulic system.

The nature, principle, details, and utility of the invention will be more clearly apparent from the following detailed description with respect to preferred embodiments of the invention when read in conjunction with the accompanying drawings, in which like parts are designated by like reference numerals and characters.

Figure 2A:
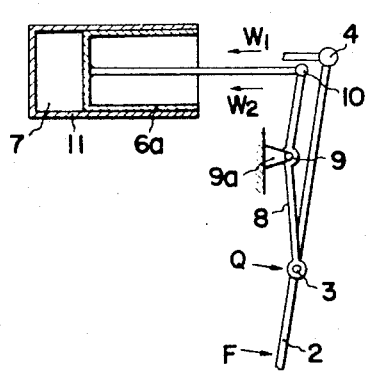
Figure 2B:
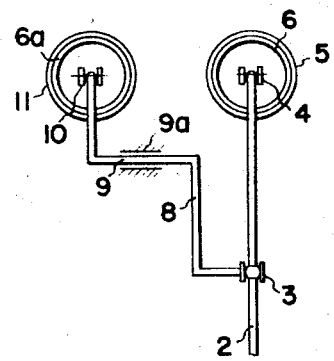

In the drawings:

FIGS. 1(a) and 1(b) are respectively a side elevational view, mostly in vertical section, and an end elevational view showing one example of a multiple master cylinder control embodying the invention;

FIGS. 2(a) and 2(b) are simplified diagrammatic views corresponding respectively to FIGS. 1(a) and 1(b) and indicating the operation of the device shown therein;

FIGS. 3(a) and 3(b) are respectively a side elevational view, with parts cut away, and a plan view showing another example of embodiment of the invention;

FIG. 4 is a simplified diagrammatic view corresponding to FIG. 3(a) and indicating the operation of the device shown therein; and FIGS. 5(a), 5(b) and 5(c) are diagrammatic perspective, side elevational, and side elevational views, respectively, illustrating examples of other multiple master cylinder control devices for reference purposes.

The two examples of brake master cylinder control devices according to the invention as illustrated in FIGS. 1(a), 1(b), 2(a) and 2(b) and FIGS. 3(a), 3(b), and 4, respectively, differ in their configurations and in the directions of their initial actuating forces relative to their assemblies of double cylinders. In mechanical and operational principle, however, the two devices are alike. Therefore, the following description applies to both examples.

In each device, there is provided a double master cylinder 1 comprising two integrally constructed master cylinders 5 and 11 parallelly and closely disposed in side-by-side arrangement and containing therewithin pistons 6 and 6a operating in the same direction. The pistons 6 and 6a are respectively provided at their heads with rubber cups 12 and 13, and a hydraulic chamber 7 of variable volume for pressurising hydraulic fluid is formed between each cup and the respective cylinder head. The hydraulic chambers of cylinders 5 and 11 are respectively provided with inlets 14 and 15 for hydraulic fluid supplied from respective supply systems (not shown) and with outlets 16 and 17 for pressurised fluid.

The pistons 6 and 6a are actuated in pressurising stroke by respective piston push rods pushed in turn by a differential linkage mechanism comprising a main lever 2 and an auxiliary lever 8. The main lever is actuatable at its one end by a pedal (not shown) and is articulatively connected at its other end by a pin 4 to the outer end of the push rod of piston 6. The auxiliary lever 8 is pivoted at an intermediate part thereof by a stationary pivot means 9 supported by a support member 9a fixed to the body of the cylinder assembly 1 and is articulatively connected at one end thereof by a pin 10 to the outer end of the push rod of piston 6a and at the other end by a pin 3 to an intermediate point of the main lever 2, the pin 3 functioning as a movable pivot of the main lever 2.

Each of the double master cylinder control devices of the above described organisation according to the invention operate in the following manner.

When the main lever 2 is pushed by the pedal in the arrow direction F as indicated in FIGS. 2(a) and 4, it rotates in the counterclockwise direction as viewed in FIGS. 1(a) and 2(a) about the pivot provided by pin 3 in the case when this pivot is held fixed or is held so as to offer appreciable resistance to movement thereof. Consequently, the end of lever 2 connected by pin 4 to the push rod of piston 6 pushes piston 6 in the direction $W_1$ toward the head of cylinder 5, thereby increasing the pressure within the hydraulic chamber 7 and applying hydraulic pressure through outlet 16 to wheel cylinders (not shown), for example.

As a result of the application of the above mentioned force F and the reaction force of the push rod of piston 6 counter to the above described action, a force in the direction Q is exerted on pin 3, whereby auxiliary lever 8 is caused to rotate in the counterclockwise direction as viewed in FIGS. 1(a) and 2(a) since it is pivoted by stationary pivot means 9. Consequently, pin 10 is moved in direction $W_2$, whereby piston 6a is pushed in its pressurising direction.

Thus, when the pedal is depressed to move main lever 2 in direction F, forces are imparted on pistons 6 and 6a in directions $W_1$ and $W_2$, the magnitudes of these forces increasing with a constant ratio as the pedal force is increased. Accordingly, if a malfunction occurs in one of the two hydraulic systems, and the path of its fluid flow is clogged, the hydraulic piston of that system will become fixed within its hydraulic cylinder, and the other hydraulic piston will produce pressurised fluid.

If a rupture occurs in the fluid conducting tubing or some other part of one hydraulic system, the hydraulic pressure in that system will drop, and the piston push rod of that system will advance until it contacts and is stopped by a stop. Accordingly, only the other hydraulic system will operate.

As is apparent from the above description, the present invention provides a multiple master cylinder control device to control two or more hydraulic systems whereby, if one hydraulic system fails, one or more of the other systems will still be operative.

While the double master cylinder devices mentioned hereinbefore and illustrated in FIGS. 5(a), 5(b), and 5(c) are not directly related to the present invention, a brief description thereof as follows for reference purposes is considered pertinent particularly to point out their deficiencies.

The device shown in FIG. 5(a) illustrates a most basic form of a differential mechanism, but in order to obtain small angular deflections (in the horizontal plane) of link AB actuated by lever L, the length of link AB must be made long. Accordingly, this mechanism has not been generally used in practice.

While the device illustrated in FIG. 5(b) is a mechanism incorporating the basic principle of the present invention of using a floating pivot, in which two cylinders are disposed in a longitudinal direction, so that it is difficult to reduce this organization to practice for reasons of bulky dimension, because said cylinders require equal dimension. Similarly, the differential mechanism shown in FIG. 5(c), in which a pinion and racks are used, gives rise to difficulties due to large dimensions.

In contrast, the device of the present invention having multiple master cylinders disposed closely together in an integral manner and simple, differential actuating mechanism can be made compact thereby to occupy very little space.

While the invention has been described above with respect to particular examples in each of which a double master cylinder is used for two independent hydraulic systems, it will be apparent that a hydraulic system further divided into multiple independent systems can be similarly controlled by increasing the number of master cylinders and further dividing the differential transmission of actuating power.

Furthermore, while the invention has been described above, with respect to its application particularly to hydraulic brake systems of wheeled vehicles, it will be apparent that the teachings of the invention are effectively applicable to other kinds of hydraulic systems controlled master cylinders.

Accordingly, it should be understood that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A master cylinder control device comprising, in combination: a plurality of master cylinders for control of respective independent hydraulic systems, said master cylinders having pistons actuatable by respective push rods and being disposed closely together in sequence and in the same operative direction; levers corresponding to said sequence each coupled at one end thereof to a respective one of said push rods, the first lever of said sequence being a main lever pivotally connected at an intermediate point thereof to the other end of the succeeding lever, the last lever of said sequence being pivotally connected at an intermediate point thereof to a stationary pivot, each of the remaining levers, if existent, being pivotally connected at an intermediate point thereof to the oher end of the succeeding lever, a force applied to the other distal end of the first lever causing all levers to operate normally in unison and to operate differentially to cause one of said hydraulic systems to operate normally in the event of a failure in one of the other hydraulic systems.

2. The master cylinder control device as claimed in claim 1 in which two master cylinders are provided.

3. The master cylinder control device as claimed in claim 1 adapted to control respective, independent hydraulic systems for operating the brakes of a wheeled vehicle.

4. The master cylinder control device as claimed in claim 1 in which said master cylinders are all formed in a single, integral cylinder block.

References Cited

UNITED STATES PATENTS

| 2,356,517 | 8/1944 | Hale. |
| 3,258,298 | 6/1966 | Holland. |
| 3,371,487 | 3/1968 | Stelzer. |

FOREIGN PATENTS

| 684,369 | 3/1930 | France. |

EDGAR W. GEOGHEGAN, *Primary Examiner.*

ROBERT R. BUNEVICH, *Assistant Examiner.*

U.S. Cl. X.R.

188—152; 303—6